US005355581A

United States Patent [19]

Soriano

[11] Patent Number: 5,355,581

[45] Date of Patent: Oct. 18, 1994

[54] METHOD AND DEVICE FOR MANUFACTURING ELECTRICAL WIRING LOOMS

[75] Inventor: Louis Soriano, Aubagne, France

[73] Assignee: L'Entreprise Industrielle, Paris, France

[21] Appl. No.: 910,350

[22] PCT Filed: Nov. 14, 1991

[86] PCT No.: PCT/FR91/00896

§ 371 Date: Sep. 15, 1992

§ 102(e) Date: Sep. 15, 1992

[87] PCT Pub. No.: WO92/10013

PCT Pub. Date: Jun. 11, 1992

[30] Foreign Application Priority Data

Nov. 23, 1990 [FR] France .............................. 90 14975

[51] Int. Cl.5 ...................... H01R 43/00; B23P 23/00

[52] U.S. Cl. .................................... 29/857; 29/564.1; 29/748; 414/786

[58] Field of Search ................. 29/748, 755, 861, 749, 29/857, 564.1, 868; 414/786

[56] References Cited

U.S. PATENT DOCUMENTS

| | | | |
|---|---|---|---|
| 4,428,114 | 1/1984 | Teagno | 29/748 X |
| 4,581,796 | 4/1986 | Fukuda et al. | 29/748 X |
| 4,835,858 | 6/1989 | Adlon et al. | 29/748 X |
| 5,083,369 | 1/1992 | Cerda . | |
| 5,208,977 | 5/1993 | Richard | 29/861 |

FOREIGN PATENT DOCUMENTS

| | | | |
|---|---|---|---|
| 0277279 | 8/1988 | European Pat. Off. | H01R 43/20 |
| 0286208 | 10/1988 | European Pat. Off. | H01R 43/20 |
| 2555397 | 5/1985 | France . | |
| 2607653 | 6/1988 | France | H05K 13/06 |
| 2619258 | 2/1989 | France . | |
| 2087760 | 6/1982 | United Kingdom | H01R 43/00 |

*Primary Examiner*—Carl J. Arbes
*Attorney, Agent, or Firm*—Ladas & Parry

[57] ABSTRACT

A device for manufacturing electrical wiring looms comprises temporary holding clips (11) for the wire ends with a high holding capacity, located on the linear conveyor between the transfer clips and an insertion station. The temporary holding clips comprise a base (14) carrying the clip body (15) which has recesses (16) separated by walls (17). The walls have at least one retaining lip (21) extending substantially along the opening (16A) of recesses (16). The flexible tubing (18) with predetermined length can be flattened and inserted into the recesses.

7 Claims, 9 Drawing Sheets

FIG. 7
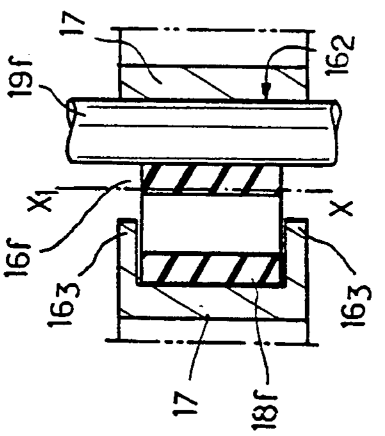
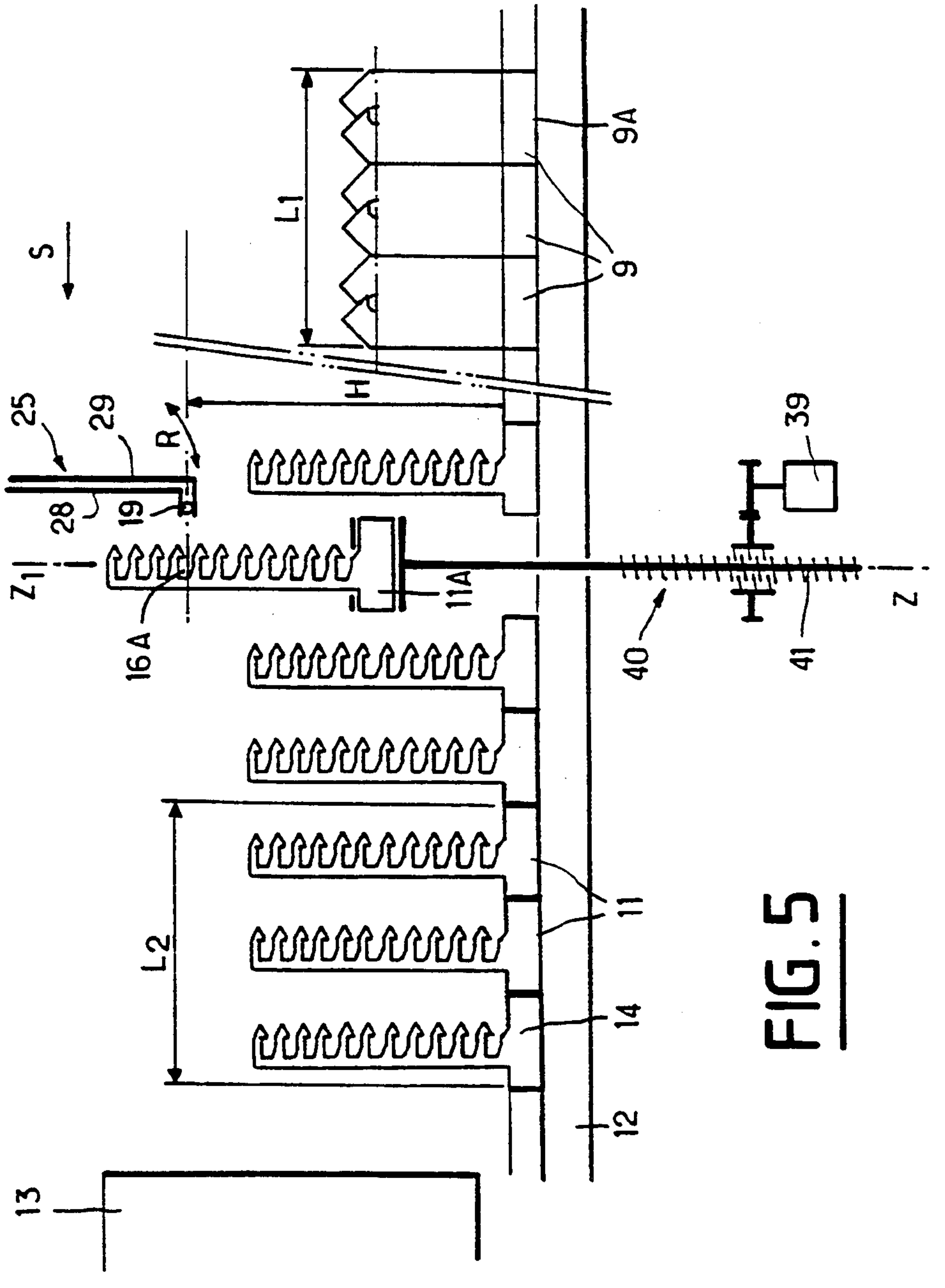
FIG. 5

METHOD AND DEVICE FOR MANUFACTURING ELECTRICAL WIRING LOOMS

This invention is relating to a method and its implementation device for manufacturing electrical wiring looms.

The technical field of this invention is that of electrical wiring loom manufacturing.

Electrical wiring looms are already used for numerous domestic or industrial electrical appliances such as washing machines and cars.

Electrical wiring looms are composed of a plurality of electric wire conductors which are grouped together, e.g. by means of a plastic clamp or an adhesive band to form an assembly of electric links which can be connected and fastened to a bracket.

Each wire is first cut to the desired length, then stripped, and its ends can be crimped onto a lug or inserted into a component (connector, socket . . . ) as required.

The manufacturing of the electrical wiring looms then consists in grouping together the wires thus prepared and inserting their ends into the components, and ensuring the cohesion of the looms thus formed using bonding means such as clamp or adhesive band.

Methods and devices to manufacture automatically wires cut to the desired length, stripped and crimped are already known, and are described, for example, in the patent applications FR 88/16702 and FR 87/11392.

The general problem is that of the automatized manufacture of the looms of electric wires, that electric wires being supplied with machines which are known and which generally include a linear conveyor on which move transfer clips, each clip gripping one end of an electric wire. Each electric wire is thus gripped by two adjacent transfer clips which are placed one after the other along the conveyor.

Generally an insertion station is located after this conveyor where an insertion device can insert the ends of the wires into the receiving sockets of the components, starting with the first wire fed out by the conveyor and continuing with the following wires.

The problem which arises here is that of not being able to insert ends into components which have already received some ends of other wires: the density of the receiving sockets of the connectors is such that in many cases an automatic insertion device cannot insert the ends of the last wires to be inserted into this component due to the impediment of previous wires whose ends are already inserted.

Another problem is that of being able to place prepared wires next to the insertion station when the looms to be manufactured contain a very great number of wires and numerous components.

These problems are exacerbated further when there are numerous wires and the length of the loom is relatively short.

According to the invention the relevant problem is solved by offering a method of manufacturing looms of electric wires (1, 2, 3, 4 . . . ) whose ends are fitted with terminals which are destined to be inserted into sockets provided in connectors, each of said wires being gripped near to its ends by two adjacent transfer clips which are arranged one after another on a linear conveyor, in such a way that the next procedures are as follows:

In the preparation phase:

said connectors are placed on an insertion station a sequence of temporary holding clips for temporarily holding the ends of said wires are positioned near said insertion station and linear conveyor.

a predetermined order of insertion of said terminals into said sockets of said connectors is decided upon.

said wires are sequentially held by a line of said transfer clips placed on and moved by said linear conveyor. According to a wire sequence, the first wire (1) in said line of said transfer clips contains the terminal which must first be inserted according to said order of insertion into said sockets, that each following wire (2), (3), (4), in said line of said transfer clips contains at least one terminal to be subsequently inserted into said sockets according to said order of insertion, after at least one terminal of each of said prior wires, i.e., respectively after at least one terminal of said wire (1), respectively after at least one terminal of said wires (1), (2), and respectively after at least one terminal of said wires (1), (2), (3).

And in a holding-insertion phase:

the first wire, located in said line of said transfer clips, is extracted by a displacable grip from said transfer clips, and at least one of said wire ends supporting said terminals of said first wire is inserted into one of said socket, according to said order of insertion. The non-inserted end of said first wire is placed in one of said temporary holding clips.

Likewise according to the insertion order, the ends of the following wires are either directly inserted into the corresponding sockets or held in the temporary holding clips after being extracted from the transfer clips. The non-inserted ends are temporarily held and arranged in the sequence of the temporary holding clips in accordance with the insertion order.

(1) If the non-inserted wire end will be inserted into a socket right after the last inserted wire end, it should be held in the first temporary holding clip.

(2) The following non-inserted wire ends will be inserted into the sockets subsequently in the order of the insertion, i.e. subsequently following the first temporarily held non-inserted end.

Advantageously, in the holding-insertion phase, after having extracted said wire from said transfer clips and inserted at least one of said wire ends into said socket, the noninserted wire ends are placed in a sequence in the temporary holding clips, according to an order of increasing lengths of said wires in said sequence of said temporary holding clips from the one closest to the insertion station to the farthest.

Advantageously said temporary holding clips of said wire ends are located on said linear conveyor between said transfer clips and said insertion station and said temporary holding clips have a high holding capacity of said wire ends.

The holding capacity of a transfer clip or a temporary holding clip stands for the number of wire ends which can be held by a single clip (transfer clip or temporary holding clip). In the industry, the holding capacity can be expressed by reference to the unit length of the conveyor, such as a meter.

The holding capacity of the temporary holding clips is twice as many as that of the transfer clips, and preferably five times more than that of the trnasfer clips. Preferably, the holding capacity of the temporary holding clips is 50 wire ends per meter of the linear conveyor.

The problem posed is also answered in obtaining a device for manufacturing electrical wiring looms whose ends are fitted with terminals which are destined to be inserted into sockets provided in components, each of said wires being gripped near its ends by two adjacent transfer clips of a linear conveyor in such a way that the device makes available temporary holding clips of said wire ends having a high holding capacity and such that said temporary holding clips are located on said linear conveyor between said transfer clips and an insertion point.

Advantageously said temporary holding clips comprise a base which can cooperate with said conveyor in such a way that the latter can carry along said clips and said base carrying the clip body has recesses separated by walls and said walls have at least one retaining lip which extends substantially along the opening of said recesses.

Advantageously the device, in compliance with the invention comprises lengths of flexible tubing which can be flattened and inserted into said recesses, the axis of said tubing lengths remaining substantially parallel to the longitudinal axis of said recesses so that when said tubing lengths are located in said recesses, they can be flattened, rolled or bent to enable said wires to be inserted into said recesses, and said tubing lengths can act as a stop which maintains said wire ends in said recess, and the ratio between the outer diameter of said tubing and the width of said recesses is between 1 and 2, and preferably between 1.1 and 1.4.

Advantageously said lengths of flexible tubing are made of hollow tube and the ratio between the thickness $E_1$ of said flexible tubing and its outer diameter is between 0.4 and 0.1.

Advantageously said recesses comprise at least one hollow groove provided in one of said walls bordering said recess, and said groove extending substantially along said longitudinal axis of said recess, and the free end of said walls being fitted with inclined faces which facilitate the guidance and introduction of said lengths of flexible tubing and/or of said wires into said recesses of said temporary holding clips, and at least one of said walls comprises at least one longitudinal stop which impedes said tubing length from coming out of he cavity in the case that the tubing length moves longitudinally along the axis.

Advantageously and in compliance with the invention, the device comprises a manipulator fitted with gripping means of said wire ends, that can introduce said wires into said recesses, and said recesses are superimposed at regular intervals along a substantially vertical axis, in such a way that more than fifty of said temporary holding clips can temporarily be stored, preferably at least two hundred ends of said wires per linear meter of said conveyor.

Advantageously, said manipulator comprises at least one carriage which can move above said temporary holding clips and along an axis substantially parallel to the longitudinal axis of said conveyor, that manipulator comprising means for positioning said wire gripping means facing the opening of one of said recesses, in such a way that said manipulator can introduce and/or extract from said recesses said wire ends.

The methods developed in compliance with the invention and their implementation device offer numerous advantages, and notably enable electric wiring looms which have a high density of connections and branches to be manufactured.

The numerous advantages of the invention will be better understood with the following description referring to the attached drawings which represent with no limitative feature devices and method stages according to the invention.

The FIGS. 1A, 1B represent schematically stages of implementation of a method according to the invention, in the case of an electric wiring loom with a low density of wire ends.

The FIGS. 2A to 2J represent schematically the main stages of a method according to the invention for the manufacture of a wiring loom with a high density of wire ends.

FIG. 5 is a schematic cross-section view of an alternative way of embodiment of a device according to the invention.

FIG. 7 is a sectional view along VII—VII of FIG. 6.

Figure 1A:
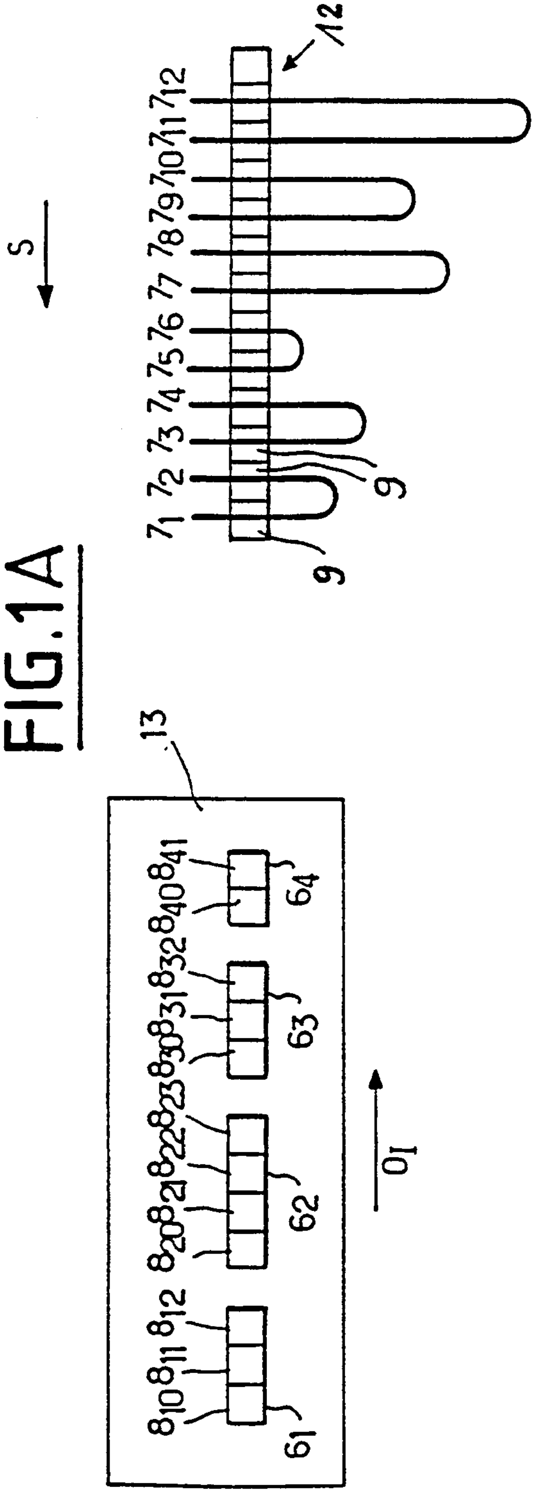

It can be noted in FIG. 1A that four connectors $6_1$, $6_2$, $6_3$, $6_4$ are placed on insertion point 13: said connectors $6_1$ comprising three sockets $8_{10}$, $8_{11}$, $8_{12}$, into which ends of electric wires are to be inserted; said connector $6_2$ comprises sockets $8_{20}$, $8_{21}$, $8_{22}$, $8_{23}$; third connector $6_3$ comprises sockets $8_{30}$, $8_{31}$, $8_{32}$; fourth connector $6_4$ comprises sockets $8_{40}$ and $8_{41}$.

Furthermore it can be noted that at the end of conveyor 12, on which transfer clips 9 can move in the direction of the arrow S, each of the electric wires is gripped by two adjacent transfer clips, each clip gripping a wire end, each wire being thus represented under the form of a pin.

The wires placed on said transfer clips have preferably been cut to the desired length, stripped and as the case may be crimped on lugs.

In FIG. 1A, the arrow OI represents the selected insertion order to insert ends 7 of said wires into said sockets of said connectors: it has been indeed provided for to insert successively said ends of said wires into sockets $8_{10}$, $8_{11}$, $8_{12}$, $8_{20}$, $8_{21}$, $8_{22}$, $8_{23}$, $8_{30}$, $8_{31}$, $8_{32}$, $8_{40}$ and $8_{41}$. It can be noted that, according to the invention, wires 7 have been manufactured in such an order that ends 7 of the wire gripped by said transfer clips 9 on said conveyor 12 come out in an order where they are identified up $7_1$, $7_2$, $7_3$, $7_4$ . . . $7_{12}$. Moreover it is known that end $7_1$ of the first wire must be inserted into socket $8_{10}$ of the first connector $6_1$, that end $7_3$ of the second wire must be inserted into socket $8_{11}$, that end $7_5$ must be inserted into socket $8_{12}$, that end $7_2$ must be inserted into socket $8_{20}$, end $7_4$ into socket $8_{21}$, end $7_7$ into socket $8_{22}$, end $7_9$ into socket $8_{23}$, end $7_8$ into socket $8_{30}$, end $7_6$ into socket $8_{31}$, end $7_{11}$ into socket $8_{32}$, end $7_{12}$ into socket $8_{40}$, end $7_{10}$ into socket $8_{41}$.

Figure 1B:
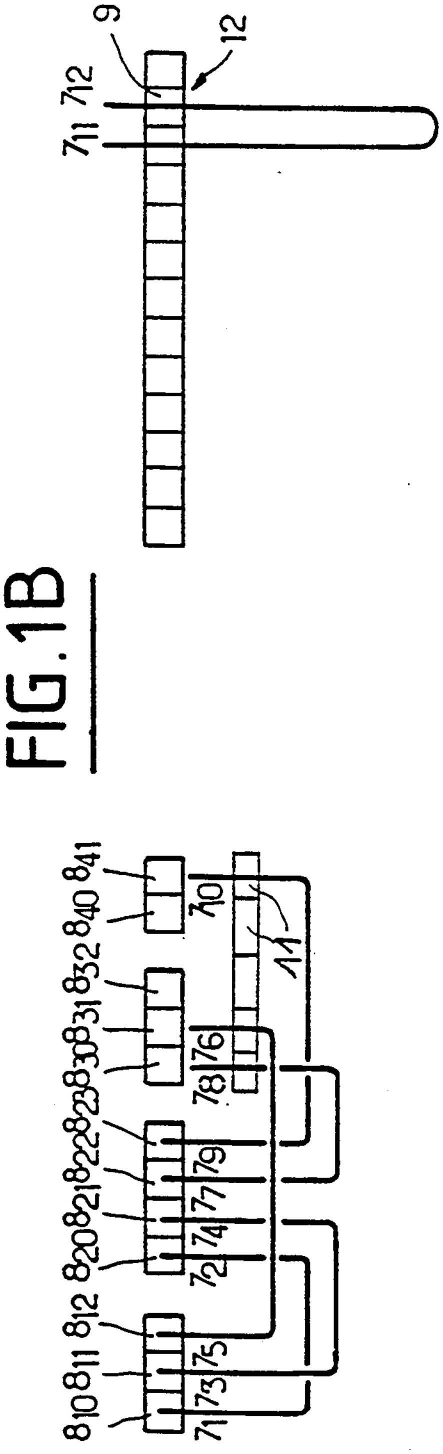

It can be noted in FIG. 1B, in compliance with the invention, that a sequence of temporary holding clips 11 of said wire ends has been provided for.

It can be noted according to the representation shown that, in compliance with the invention, the first five wires of said transfer clips 9 of said conveyor 12 have been extracted in such a way that only the last wire, comprising said wire ends $7_{11}$ and $7_{12}$, remains in said transfer clips.

It can be noted that at least one of said ends of said wires extracted from said transfer clips has been inserted, more precisely said wire ends $7_1$, $7_3$, $7_5$, $7_2$, $7_4$, $7_7$, $7_9$ have been inserted respectively into said sockets $8_{10}$, $8_{11}$, $8_{12}$, $8_{20}$, $8_{21}$, $8_{22}$, $8_{23}$.

It can be noted that said non-inserted ends of said wires having been gripped are placed in said temporary holding clips 11. In the steps following the stage represented by this figure, one proceeds in compliance with the invention:

by gripping said wire end $7_8$ located in one of said temporary holding clips and inserting it into said socket $8_{30}$.

by gripping said wire end $7_6$ located in one of said temporary holding clips and inserting it into said socket $8_{31}$.

by extracting said last wire from said transfer clips and inserting respectively said ends $7_{11}$ and $7_{12}$ of said last wire into said sockets $8_{32}$ and $8_{40}$.

and finally by gripping wire end $7_{10}$ located in one of said temporary holding clips and inserting it into said socket $8_{41}$.

At this stage, the loom will be completed.

The principal steps of a loom manufacturing method according to the invention are represented in FIGS. 2A to 2J.

Figure 2A:
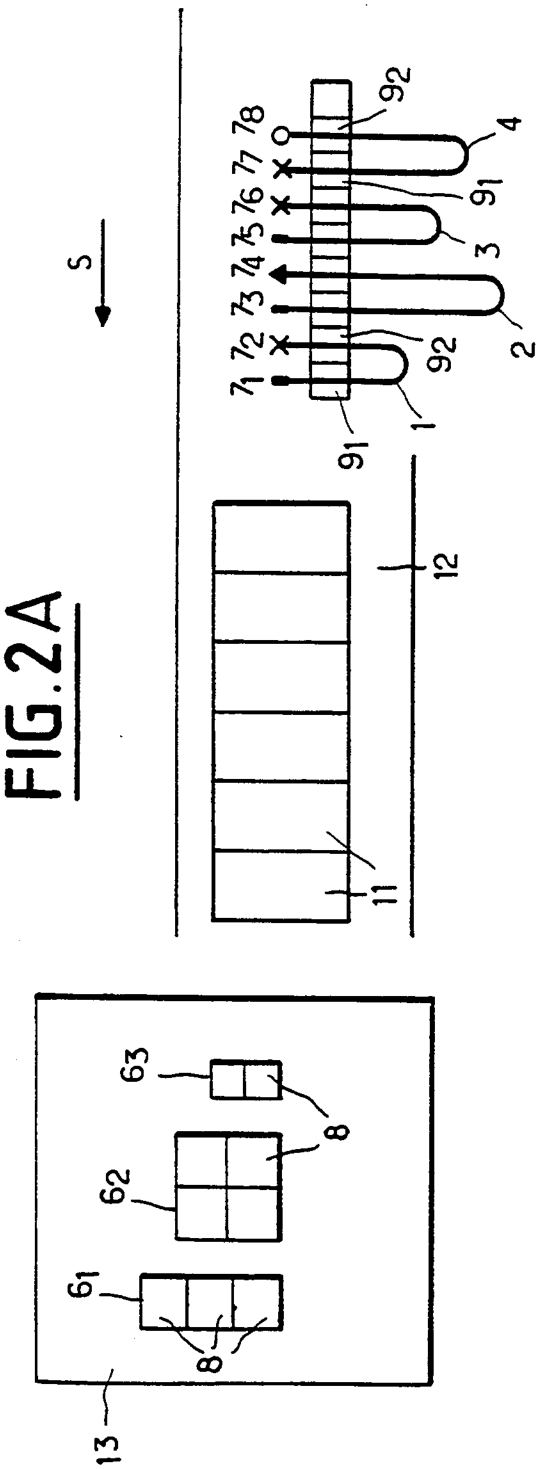

In FIG. 2A it can be seen that the involved wires are identified 1, 2, 3, 4, each of these wires being gripped by two adjacent transfer clips $9_1$, $9_2$. It can be seen in this figure that said transfer clips are placed on a linear conveyor 12, which can move forward said transfer clips in a direction indicated by the arrow S. We can see that connectors identified $6_1$, $6_2$, $6_3$ comprising sockets 8 are also available on an insertion point 13 located after said conveyor 12. We see according to the invention that temporary holding clips 11, which are located near said insertion point 13, are placed on said conveyor after said transfer clips. We see that said wire 1 comprises two ends identified $7_1$ and $7_2$, that said wire 2 comprises two ends identified $7_3$ and $7_4$, that said wire 3 comprises two ends identified $7_5$ and $7_6$, and that said wire 4 comprises two ends identified $7_7$ and $7_8$. We see that each of said wires is gripped near each of its ends by said adjacent transfer clips $9_1$ and $9_2$.

Figure 2B:
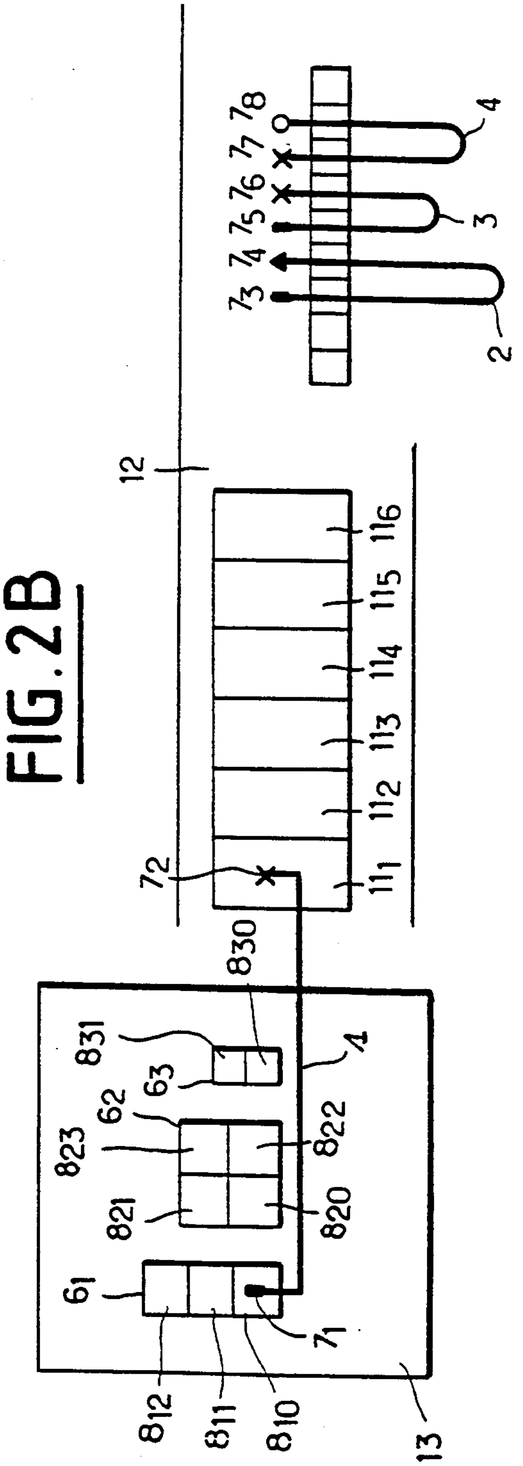
Figure 2C:
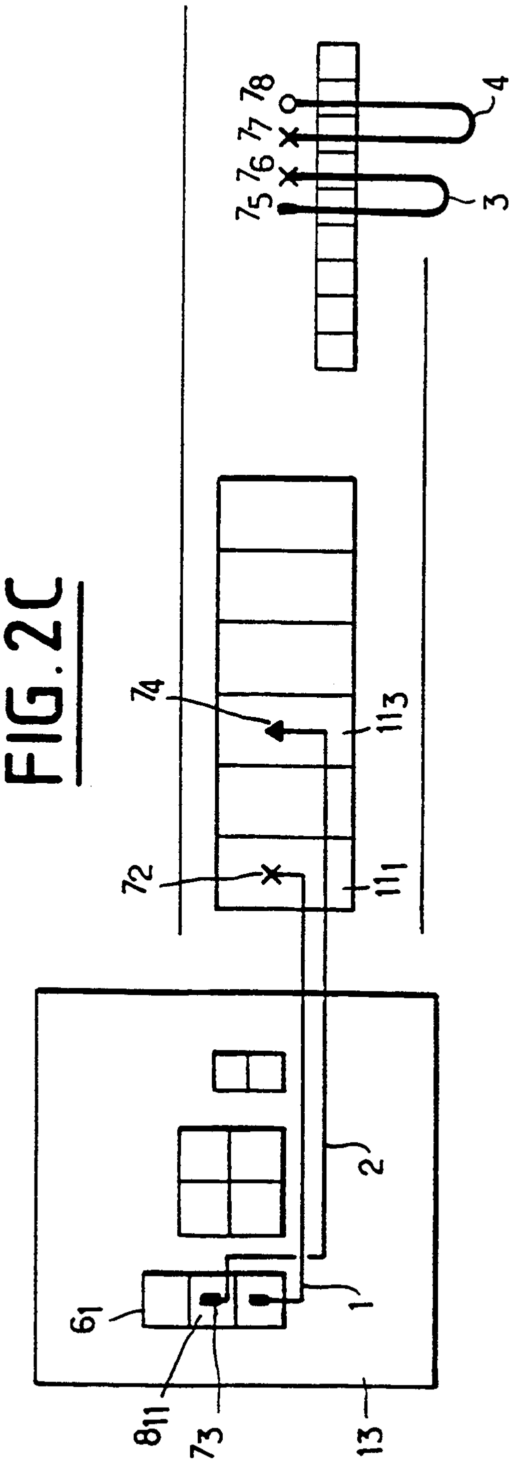
Figure 2D:
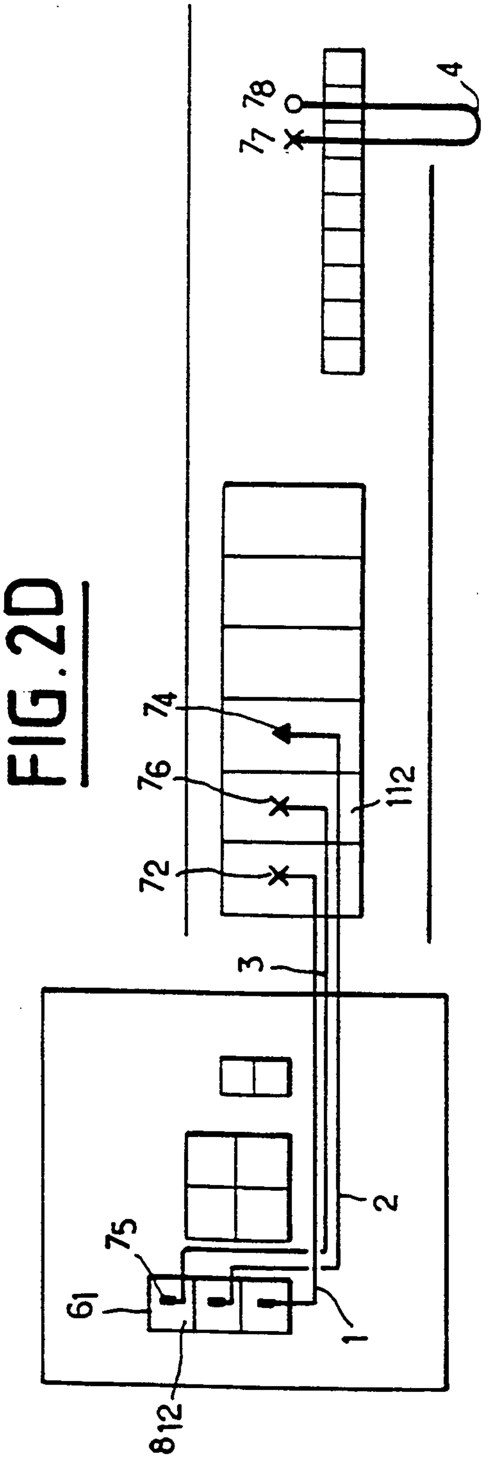
Figure 2E:
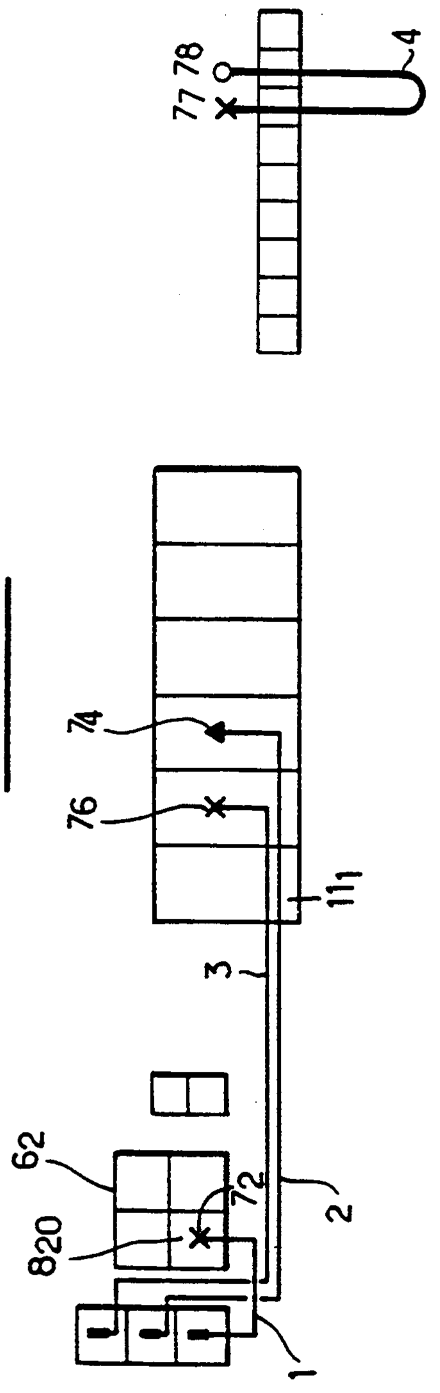
Figure 2F:
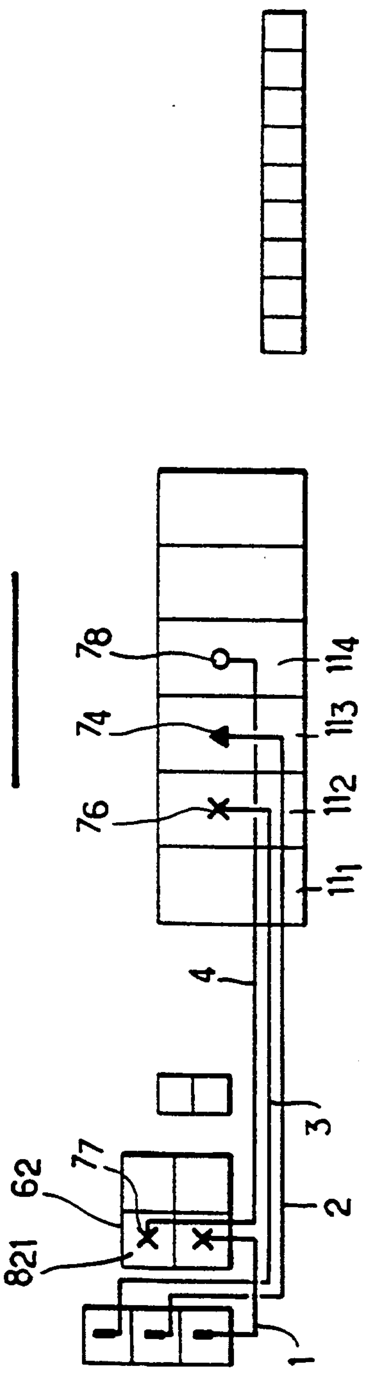
Figure 2G:
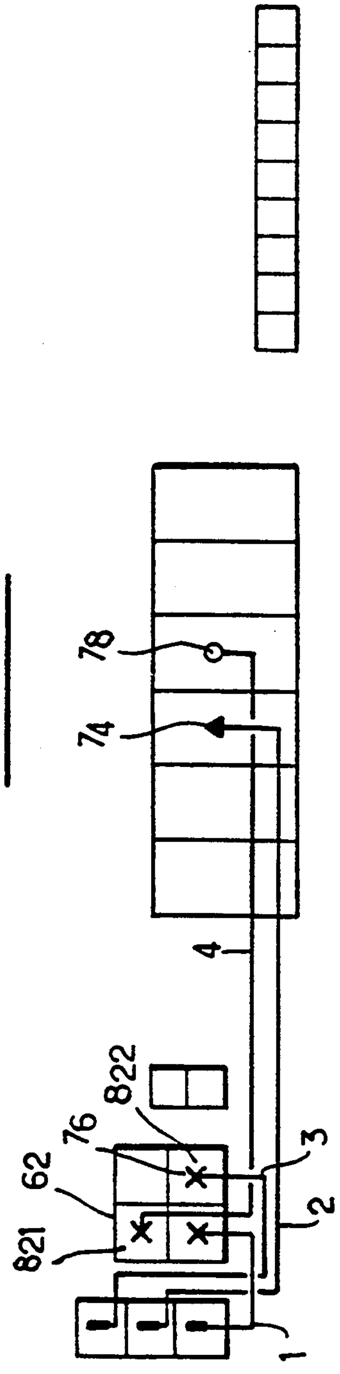
Figure 2H:
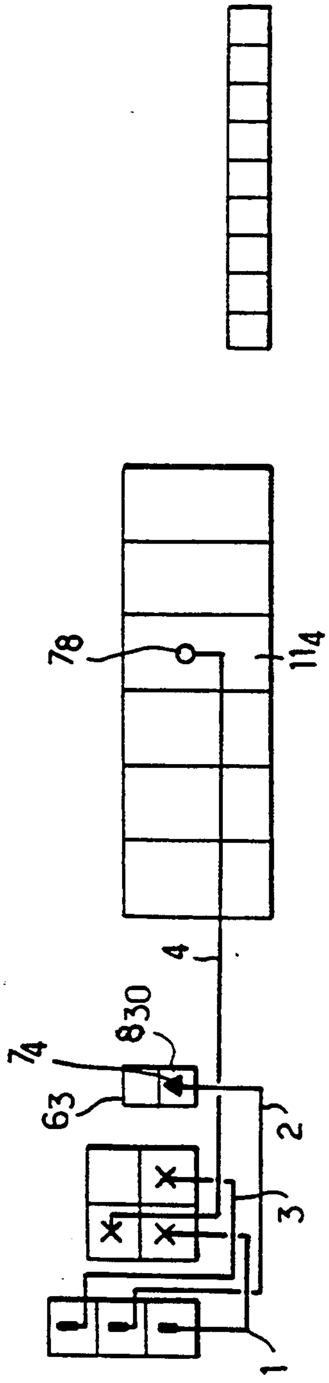
Figure 2I:
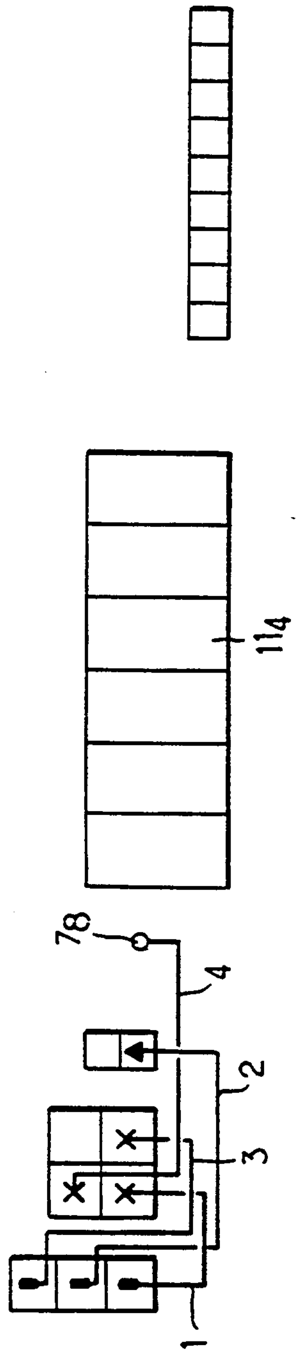
Figure 2J:
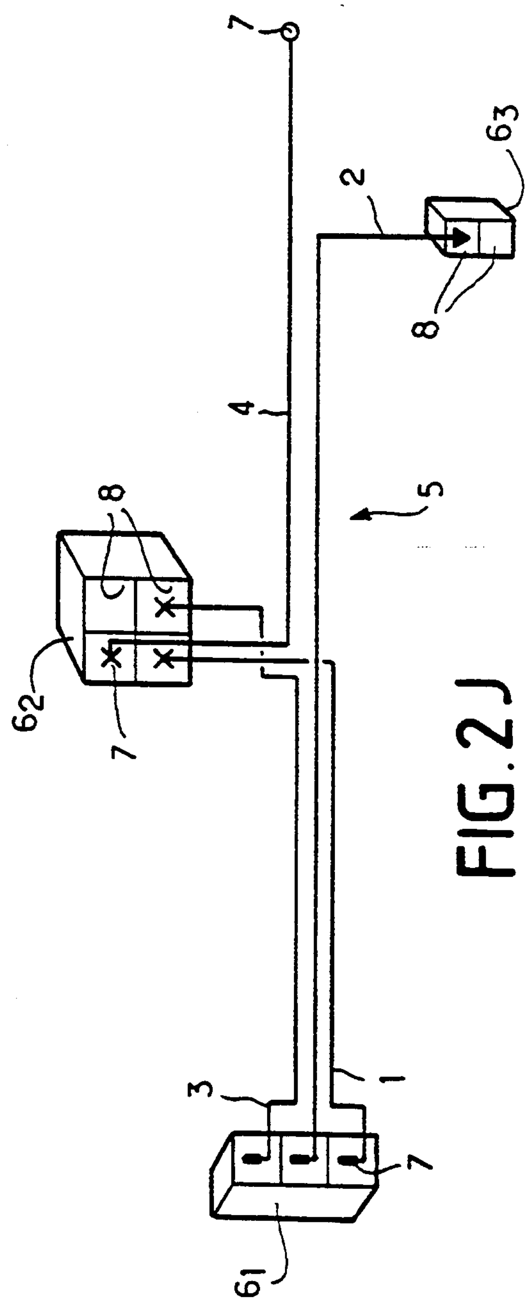

In the example of the implementation of the method according to the invention which is represented in FIGS. 2A to 2J, said wires are fitted with connections at their end which are schematically drawn with a thick line, or a cross, or a triangle, or a circle. Indeed, we see that said wire ends $7_1$, $7_3$, $7_5$ are drawn with a thick line, that said wire ends $7_2$, $7_6$, $7_7$ are drawn with said cross, that said wire end $7_4$ is drawn with said triangle and that said wire end $7_8$ is drawn with said circle. Indeed said thick line, said cross, said triangle and said circle represent various connection types corresponding to diverse socket types in said connectors 6; we see in the FIG. 2B that said connector $6_1$ comprises said sockets $8_{10}$, $8_{11}$, and $8_{12}$, that said connector $6_2$ comprises said sockets $8_{20}$, $8_{21}$, $8_{22}$, and $8_{23}$, that said connector $6_3$ comprises said sockets $8_{30}$ and $8_{31}$. We see in the FIG. 2J representing the loom which has been manufactured according to the method of the invention that said connector $6_1$ comprises sockets capable of receiving said ends 7 of said thick line type wires; we see in this figure that said connector $6_2$ comprises said sockets 8 designed for receiving the cross type connections; we see that the connector $6_3$ comprises said sockets 8 designed for receiving said triangle type connections; we also see that one end of said wire 4 fitted with said circle type connection is left free.

In the example represented in FIGS. 2A to 2J it was decided to insert said ends of said wires into said components according to the following order: $8_{10}$, $8_{11}$, $8_{12}$, $8_{20}$, $8_{21}$, $8_{22}$, $8_{30}$. Consequently, the insertion order of said wire ends in said connectors is as follows: $7_1$, $7_3$, $7_5$, $7_2$, $7_7$, $7_6$, $7_4$, the wire end $7_8$ being not inserted in one of said connectors.

In FIG. 2B, the first wire identified 1 has been extracted from the first two transfer clips in the line of said transfer clips. The first wire 1 is extracted by a displaceable gripping means 25 (shown in FIG. 4). The gripping means 25 moves along an axis $YY_2$ above the conveyor towards the insertion station, and inserts the first end $7_1$ in the socket $8_{10}$ of the connector $6_1$ provided on the insertion station. The second end $7_2$ of the first wire 1 is placed in the first temporary holding clip $11_1$ because it will be the first end among other following ends temporarily held thereon to be inserted to a corresponding socket, according to the insertion order.

As seen in FIG. 2C, the second wire 2 in the line of said transfer clips has been extracted by the gripping means 25 from the transfer clips. It has one end $7_3$ inserted in socket $8_{11}$ of the connector $6_1$ and another end $7_4$ temporarily held in a temporary holding clip $11_3$. The other end $7_4$ of the second wire 2 will be the third end to be inserted into a socket (explained hereinafter) among those ends temporarily held thereon in accordance with the insertion order.

As further seen in FIG. 2D, the third wire 3 has one end $7_5$ inserted in socket $8_{12}$ of the connector $6_1$ and another end $7_6$ temporarily held in the temporary holding clip $11_2$. The extraction and the insertion of the third wire 3 are completed by the gripping means 25 in accordance with the insertion order as described above. The detailed structure and operation of the gripping means 25 will be further discussed hereinafter.

It is the insertion order that determines on which temporary holding clip the non-inserted wire end of each wire is temporarily held. The insertion order is predetermined, aiming to resolve the problems in the wiring loom manufacture for electric components, such as connectors in this case.

We see in FIG. 2E that in the next phase of the method according to the invention, said end $7_2$ of said wire 1 is inserted into said socket $8_{20}$ of the second connector $6_2$.

In FIG. 2F, we see that in the next phase, we are gripping the fourth wire (identified 4) located in said line of transfer clips, and said wire end $7_7$ is inserted into said socket $8_{21}$ of said connector $6_2$ and said wire end $7_8$ is placed in said temporary holding clip $11_4$, which is further away from the insertion station than said temporary holding clips $11_3$, $11_2$, $11_1$ containing respectively said wire ends $7_4$ and $7_6$. The wire ends are retrieved respectively by the gripping means 25 from the temporary holding clips to be inserted into corresponding sockets in accordance with the insertion order.

In FIG. 2G, we see that in the next phase, said end $7_6$ of said wire 3 is extracted from the temporary holding $11_2$ and inserted into said socket $8_{22}$ of said connector $6_2$; in FIG. 2H, said end $7_4$ of said wire 2 is extracted from the temporary holding clip $11_3$ and inserted into said socket $8_{30}$ of said connector $6_3$; in FIG. 2I, we see that we are gripping said end $7_8$ of said wire 4 which is extracted from said temporary holding clip $11_4$ in order to be placed next to said connectors; at the end of the procedures represented in FIG. 2I, said loom has been manufactured in compliance with the method of the invention.

It can be seen in FIG. 2J, where said loom is shown at the end of the procedures represented in FIG. 2I, that said connector $6_1$ in another way of representation receives said ends of wires 1, 3, 2 drawn by a thick line, that said connector $6_2$ receives said ends 7 of said wires 1, 3, 4 represented by said crosses and that said connector $6_3$ receives an end of said wire 2 represented by said triangle; and we see that an end 7 of said wire 4 represented by a circle remains non-inserted.

Figure 3:
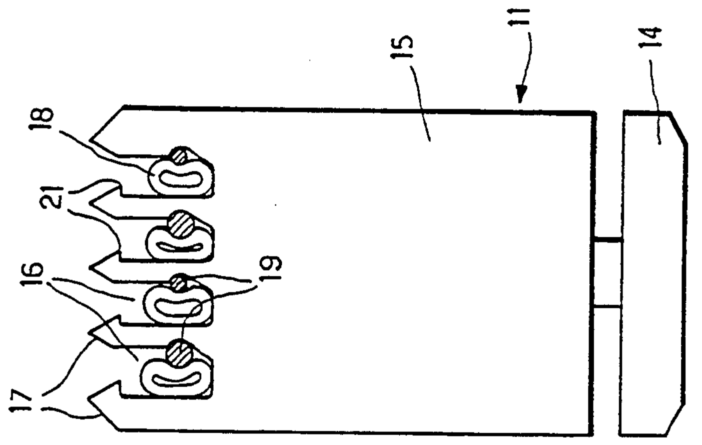
FIG. 3 is a cross-section view of a special embodiment method of a temporary holding clip according to the invention.

We see in FIG. 3, representing a side view of the means of embodiment of a temporary holding clip according to the invention, that said clip 11 comprises a base 14 which can cooperate with said conveyor so that said conveyor can initiate the motion of said holding clip 11. We see that said temporary holding clip comprises above said base, a connection 15 comprising recesses 16 separated by walls 17, and said walls comprise a retaining lip 21 extending substantially along the opening of said recesses; we see in FIG. 3 that lengths of flexible tubing 18 which can be flattened and introduced into said recesses, have been inserted into said recesses, and that wires 19 have been inserted into said recesses and are retained by said lengths of flexible tubing.

Figure 4:
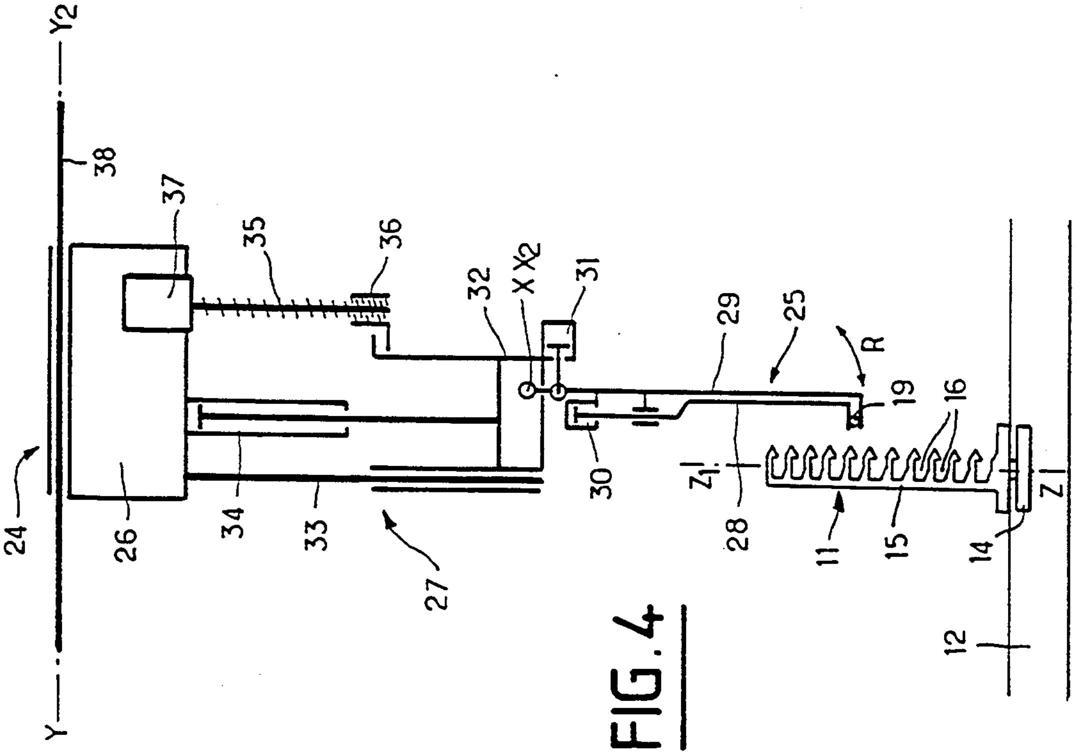
FIG. 4 is a schematic cross-section view of a device for manufacturing electrical wiring looms according to the invention.

In FIG. 4, is shown another way of embodiment of said temporary holding clips 11, in which said recesses 16 are superimposed at regular intervals along a substantially vertical axis $zz_1$; we see that said body 15 of said temporary holding clip comprising said recesses tops said base 14 of said temporary holding clip, that base cooperating with said conveyor 12.

In FIG. 4 is shown a schematic view of a manipulator 24 fitted with means 25 for gripping wire ends, that manipulator being capable of extracting said wires from and inserting said wires into said recesses of said temporary holding clips. Said gripping means 25 comprise in particular a first jaw 29 and a second jaw 28 which can slide in relation to the first jaw 29 in a direction substantially parallel to said axis $zz_1$, e.g. by the action of a clamping actuator 30; in this way, when said actuator brings together said ends of said jaws 28 and 29, wire 19 can be clamped between said jaws so that it will be held by the gripping means; it can be seen, advantageously, that said gripping means comprise a swivelling actuator 31 of said taws 28 and 29; we see that said actuator 31 allows said jaws to swivel in relation to an axis $xx_2$.

Advantageously, said actuator 31 and said axis $xx_2$ are connected to a vertical carriage 32 which can slide substantially along said axis $zz_1$ thanks to vertical motion actuator 34 and screw 35; said screw 35 enables nut 36 to be positioned, that nut acting as a stop and limiting the downward travel of said vertical carriage because of the action of said vertical motion actuator; vertical guiding means 33 can advantageously be provided for guiding said travel of said vertical carriage, in relation to a main carriage 26; we see that a vertical travel motor 37 enables said screw 35 to be driven; we also see that by the action of said actuator 31 which actuates a swivelling of said jaws in relation to said axis $xx_2$, the end of said jaws which can hold said wire 19 will carry out an arc of a circle movement represented by the arrow R. We also see that said main carriage 26 can move on a translational motion guide 38 along an axis $yy_2$ which, advantageously, is parallel to the motion axis of said linear conveyor 12.

In FIG. 5 it can be seen that a device for manufacturing electric wire looms in compliance with the invention comprises said temporary holding clips 11 which are located on said conveyor 12 after said transfer clips 9; we see, advantageously, that the holding capacity of wire ends as provided by said temporary holding clips which, as represented in the example of FIG. 5, can each receive eight ends of said wires, is high in relation to the holding capacity of said transfer clips 9 which can only receive one end of said wires; advantageously said base 14 of said temporary holding clips is similar to the base 9A of said transfer clips 9, so that said temporary holding clips can be transported by said conveyor 12 initially provided for said transfer clips 9 without significant modification.

It can be seen that in compliance with the invention said temporary holding clips are located after said transfer clips on said conveyor 12, i.e. between said line of said transfer clips 9 and an insertion point 13 in the motion direction S of said conveyor 12.

In FIG. 5 is shown an alternative device in compliance with the invention in which said gripping means comprise means 40 to extract at least one of said temporary holding clips from said line of said temporary holding clips and elevate said clip in a translational motion along a substantially vertical axis $zz_1$, and comprises means 25 for gripping wires 19, which enables a motion of said jaws 28, 29 following an arc of a circle R to be performed. Said means 40 can notably have a vertical travel motor 39 which can initiate the vertical motion of a temporary holding clip **11*a* by means of a screw 41, in order to position recess 16*a*, into which it is desired to insert said wire 19, at a height 'h' corresponding to the height of one end of said jaws 28, 29**.

Figure 6:
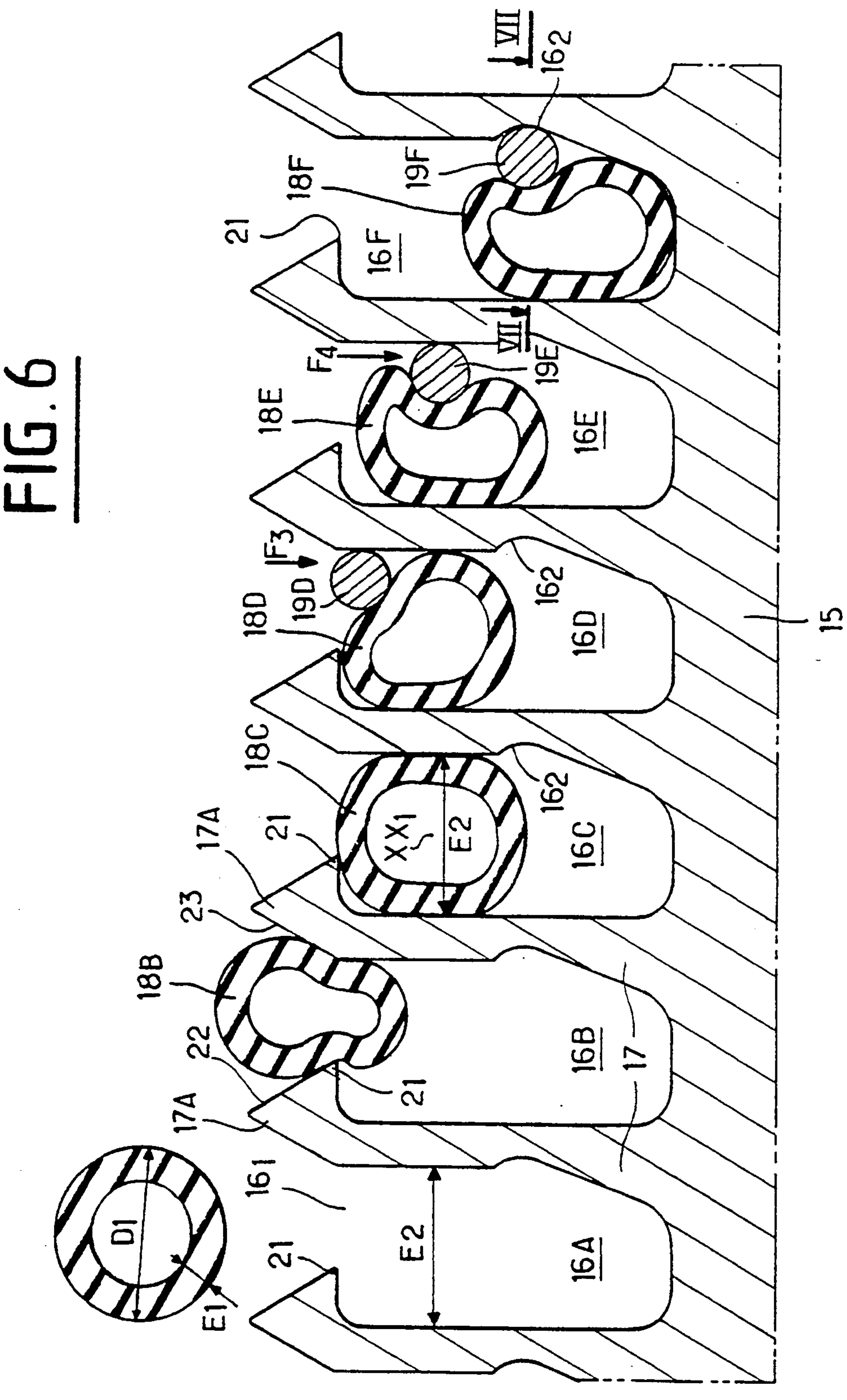
FIG. 6 is a view on a different scale concerning an embodiment detail of a temporary holding clip and the utilization thereof according to the invention.

In FIG. 6 a temporary holding clip according to the invention is represented in a partial sectional drawing at a different scale. We see that said clip comprises a sequence of recesses 16 identified **16*a*, 16*b*, 16*c*, 16*d*, 16*e* and 16*f*. We see that each of said recesses is limited by walls 17 separating two adjacent recesses. We see that each of said walls comprises retaining lip 21 extending substantially along the opening $16_1$ of said recesses. We see that the first recess 16*a*, on the left of the figure, is empty and that a length of flexible tubing 18*a* which is available near said recess is destined to be introduced into said recess; we see that in the second recess 16*b* from the left of the figure, the introduction of said length of flexible tubing 18*b* into said recess is in progress; we see that in the third recess 16*c* from the left of the figure, said length of flexible tubing 18*c* has been introduced into said recess and is held by said retaining lip 21; we see that in the fourth recess 16*d* from the left we start to introduce the end of wire 19*d* into said recess; we see that in the fifth recess 16*e*, the introduction of a wire 19*e* is in progress; and in the sixth recess 16*f* said wire 19*f* has been introduced into said recess. We see that in this way of embodiment said length of flexible tubing 18*a* is hollow with a diameter D1 and has a wall thickness E1; advantageously, the diameter D1 of said flexible tubing is greater than width E2 of said recesses. It can be seen that said lengths of tubing 18*b*, 8*d*, 18*e*, 18*f* can be bent in order to be introduced into said recesses 16*b*, 16*d*, 16*e*, 16*f*** due to the flexibility of said lengths of tubing and due to the fact that said lengths of tubing are hollow. We see that in said recess 16c, said length of flexible tubing 18c has been introduced and substantially flattened due to its diameter being greater than width E2 of said recess. In said recess 16d we see that, thanks to an insertion force F3, we can introduce a wire 19d by bending said length of tubing 18d. We see that in recess 16e, said length of tubing 18e can roll and/or be bent and/or slide to allow said wire 19e to pass through in the direction of arrow F4. We see that said wire 19f has been introduced into recess 16f and is maintained by a hollow groove $16_2$ provided in a wall of said recess and said length of tubing 18f impedes said wire 19f coming out of said recess. It can be seen that the free end 17a of said walls 17 which limit said recesses have inclined faces 22 and 23 facilitating the introduction of said lengths of flexible tubing and said wire ends.

It can be seen in FIG. 7 that said end of said wire 19f extending substantially along said longitudinal axis $xx_1$ of said recess 16f is maintained in said hollow groove $16_2$ of said wall 17 by said length of tubing 18f; we see that one of said walls 17 comprises two longitudinal stops $16_3$ which impede said length of tubing coming out of said cavity by a longitudinal motion along said axis $xx_1$.

I claim:

1. A method for manufacturing looms of electric wires, said electric wires being cut at a desired length and stripped wherein ends of said electric wires are fitted with terminals, wherein said terminals are inserted by an insertion device in sockets of connectors according to an insertion order, said method comprising following steps:

gripping each end of said electric wires by a transfer clip, each electric wire being gripped by two adjacent transfer clips in a line of transfer clips placed on a linear conveyor, said transfer clips being movable by said conveyor, placing said electric wires held by said transfer clips on said conveyor according to a wire sequence such that an end of first wire of said wire sequence is fitted with first terminal according to said insertion order, and such that an end of each following wire according to said wire sequence is fitted with following terminal according to said insertion order, successively extracting said wires from said transfer grips according to said wire sequence, inserting at least one end of each extracted wire into one of the sockets of the connectors according to said insertion order, providing temporary holding clips for temporarily holding non-inserted ends of said extracted electric wires by respectively inserting the non-inserted ends in said temporary holding clips, said temporary holding clips being movable by said conveyor, and located on said conveyor between said line of transfer clips and an insertion station comprising said insertion device, and successively extracting the non-inserted ends of said wires from the temporary holding clips and inserting them respectively into the sockets of the connectors according to said insertion order.

2. A loom manufacturing device for manufacturing looms of electric wires, said electric wires being cut at a desired length and stripped, wherein ends of said electric wires are fitted with terminals and to be inserted in sockets of connectors, said loom manufacturing device comprising:

an insertion station for supporting the connectors, a linear conveyor for feeding the electric wires to the insertion station, transfer clips being moved by said conveyor and lined up on the conveyor according to a wire sequence, each of said transfer clips gripping an end of said electric wire, each wire being gripped by two adjacent transfer clips, an insertion device for successively extracting the wires from the transfer clips and inserting said terminals thereof into the sockets of the connectors according to an insertion order, said insertion device being located along said conveyor, temporary holding clips for temporarily holding non-inserted ends of said extracted electric wires according to said insertion order, said temporary holding clips being moveable by said conveyor, each capable of holding more wire ends than that of the transfer clip, said temporary holding clips being located on said conveyor between the line of said transfer clips and said insertion station.

3. A loom manufacturing device for manufacturing looms of electric wires, said electric wires being cut at a desired length and stripped, wherein ends of said electric wires are fitted with terminals and to be inserted in sockets of connectors supported on an insertion station, said loom manufacturing device comprising:

a conveyor, an insertion device associated with the insertion station for inserting said terminals into the sockets of the connectors according to an insertion order, said insertion device being located along said conveyor, transfer clips being supported and moved by said conveyor to feed said wires to said insertion device according to a wire sequence, each of said transfer clips gripping an end of said electric wire, each wire being gripped by two adjacent transfer clips in a line of the transfer clips on the conveyor, temporary holding clips for temporarily holding non-inserted ends of said electric wires before the insertion into said sockets according to the insertion order, said temporary holding clips being moveable by said conveyor, each said temporary holding clip capable of holding more electric wire ends than the transfer clip, said temporary holding clips being located on said conveyor between the line of said transfer clips and the insertion station.

4. The device according to claim 3, wherein each said temporary holding clip comprises a base which can cooperate with said conveyor, so that the latter can carry along said clips, and said base is topped by a clip body comprising recesses separated by walls, and said walls comprise at least one retaining lip extending substantially along the opening of said recesses.

5. The device according to claim 4, wherein said recesses comprises at least one groove provided in one side of said wall bordering said recess, said groove extending substantially along a longitudinal axis of said recess.

6. The device according to claim 3, further comprising a manipulator fitted with means for gripping the wire ends, which can introduce said wires into said recesses, wherein said recesses are superimposed at regular intervals along a substantially vertical axis, so that over fifty, preferably at least two hundred ends of said wires, can be held temporarily in said temporary holding clips, per meter of said linear conveyor.

7. The device according to claim 6, wherein said manipulator comprises at least one carriage which can move above said temporary holding clips along an axis substantially parallel to the longitudinal axis of said conveyor, said manipulator comprising means for positioning said wire gripping means facing the opening of one of said recesses so that said manipulator can introduce and extract said ends of said wires from said recesses.

* * * * *